J. C. ROSS.
TRACTOR.
APPLICATION FILED JAN. 6, 1921.
1,402,095.
Patented Jan. 3, 1922.
3 SHEETS—SHEET 3.
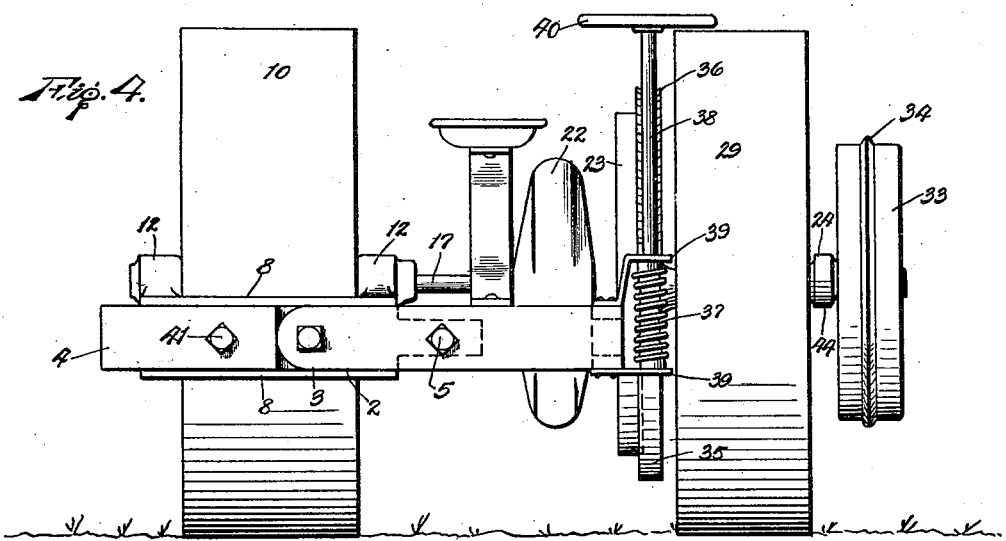
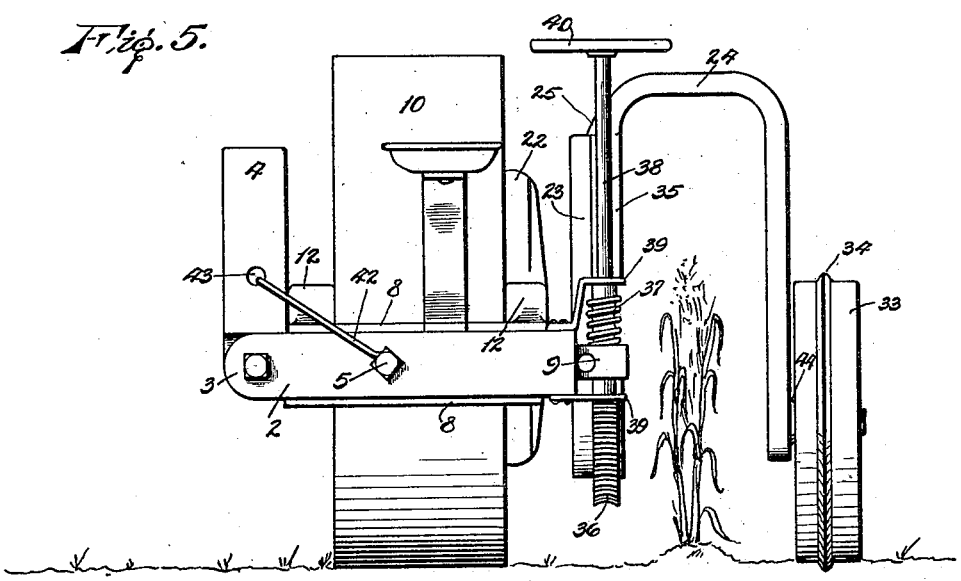
Inventor
John C. Ross.
By
Lacy & Lacey, Attorneys

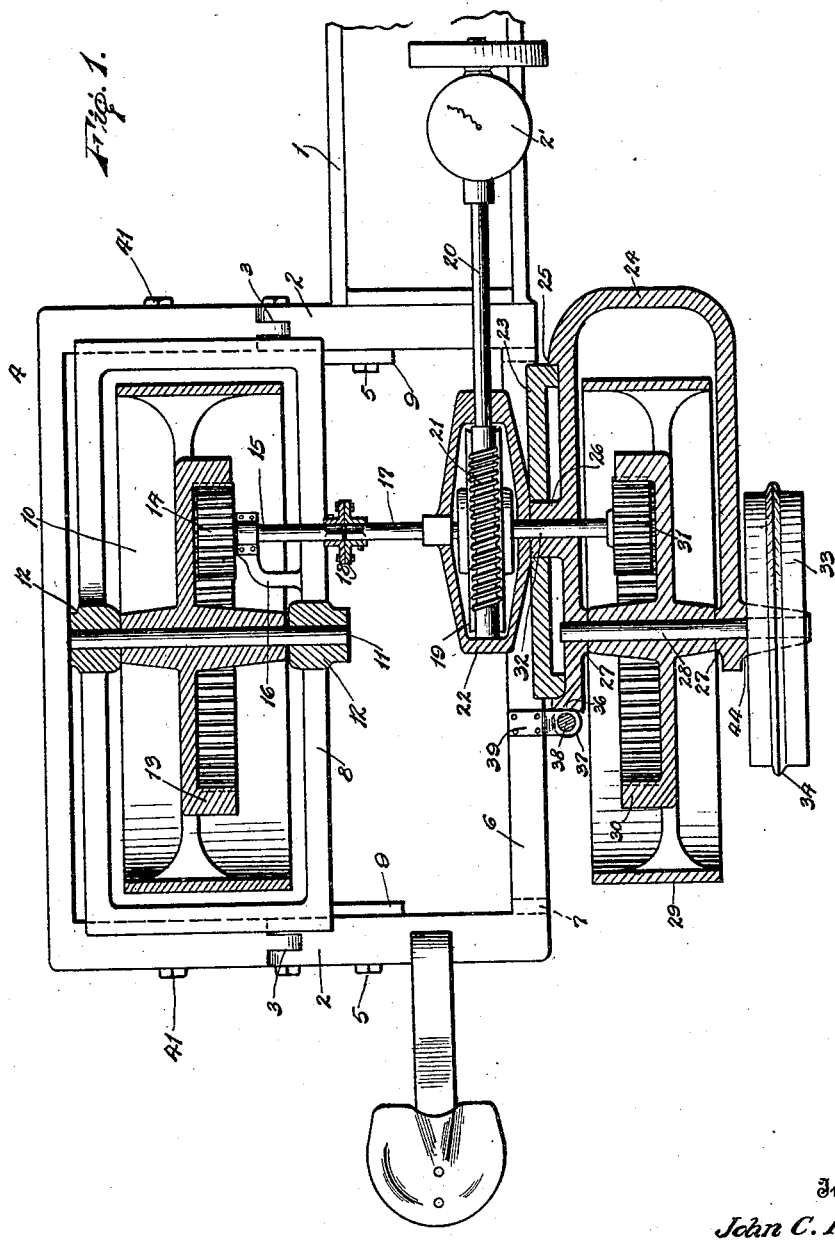

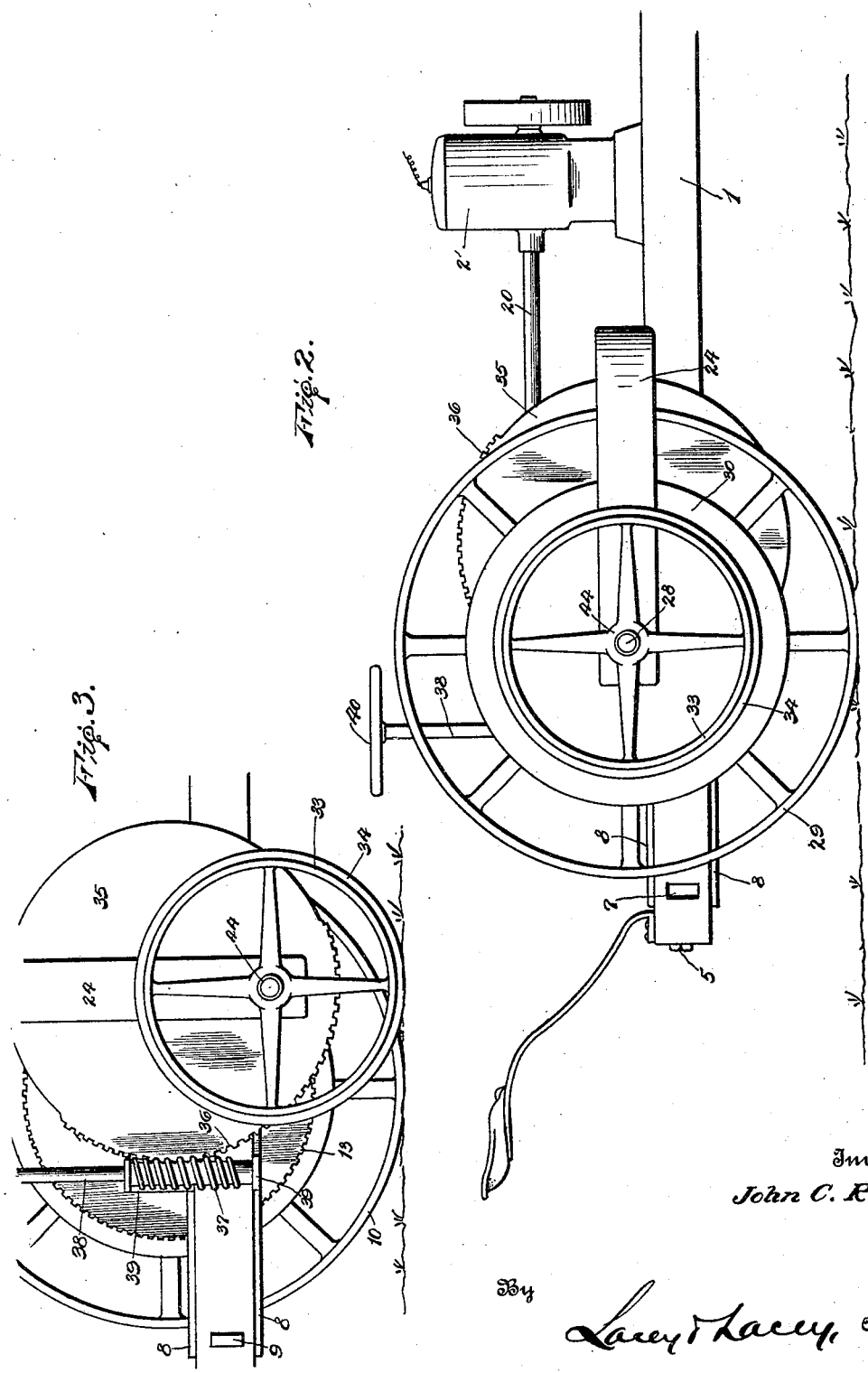

UNITED STATES PATENT OFFICE.

JOHN C. ROSS, OF AKRON, OHIO.

TRACTOR.

1,402,095.   Specification of Letters Patent.   Patented Jan. 3, 1922.

Application filed January 6, 1921. Serial No. 435,450.

*To all whom it may concern:*

Be it known that I, JOHN C. ROSS, a citizen of the United States, residing at Akron, in the county of Summit and State of Ohio, have invented certain new and useful Improvements in Tractors, of which the following is a specification.

This invention relates to tractors and has special reference to tractors of the type shown in an application for patent filed by me July 23, 1919, Serial No. 312,665. The principal object of the present invention is to provide means whereby a tractor may be employed to draw plows or other agricultural implements over a field or may be utilized to cultivate growing plants, and a secondary object of the invention is to provide novel means whereby the width of the tractor frame may be reduced when it is to be utilized to cultivate growing plants in order that the machine may travel between the rows of plants without injury to the plants in any of the rows. Other incidental objects of the invention will appear in the course of the following description and the invention resides in certain novel features which will be particularly pointed out in the claims following the description.

In the drawings—

Figure 1 is a view, partly in plan and partly in horizontal section, of so much of a tractor as is necessary to disclose my present improvements;

Fig. 2 is a side elevation showing the parts in the normal position;

Fig. 3 is a detail view showing the parts in the position assumed when a row of plants is to be cultivated;

Fig. 4 is a rear end elevation of the machine arranged for normal use;

Fig. 5 is a similar view showing the tractor adjusted for use in cultivating a row of growing plants.

Referring to the drawings more particularly by reference numerals, the main frame of the tractor is indicated at 1 and a motor 2' is illustrated conventionally upon said frame. The motor may be of any convenient or preferred type and will generally be an internal combustion engine. The rear portion of the main frame is extended laterally at one side, as shown at 2, and the ends of the extended portions are constructed to form one member of a hinge 3, the mating member of the hinge being formed on the inner extremities of the front and rear members of a supplemental frame 4. The laterally extended portions 2 of the frame carry securing bolts 5 and in the side 6 of the frame I provide transverse slots 7. It will be readily noted that the supplemental frame 4 is substantially U-shaped and when it is in horizontal position, as shown most clearly in Fig. 4, will align with the front and rear ends of the main frame so as to form substantially a part of the same. A slidable frame 8 is fitted between the front and rear ends of the supplemental frame 4 and the extensions 2, and the front and rear ends of this slidable frame are channeled so as to engage over and under the front and rear ends of the main and the supplemental frames, as clearly shown, thereby serving to prevent pivotal movement of the supplemental frame, the slidable frame being of such width that its ends will overlap the hinge connection 3, as will be readily understood. Tongues 9 are carried by the inner side of the slidable frame and bear against the transverse members of the main frame, as shown in Fig. 1, the securing bolts 5 engaging said tongues so as to prevent relative displacement of the sliding frame. One tractor wheel 10 is disposed between the sides of the slidable frame and is carried by an axle 11 mounted in bearings 12 on the sides of the said frame. An internal gear 13 is carried by the tractor wheel 10 and is preferably formed with the spokes of the wheel but, of course, any other convenient construction may be employed. This internal gear is, of course, concentric with the axle 11 and it receives motion from a spur pinion 14 which is carried by a shaft 15 mounted in a bearing bracket 16 which is carried by the inner side of the slidable frame 8. This shaft 15 is connected to a transmission shaft 17 by a coupling 18, as shown clearly in Fig. 1, and the said shaft 17 extends from a differential gear, indicated generally at 19, and driven from the engine shaft 20 through a worm gear 21. The entire differential gear is enclosed by a housing or gear case 22 and this gear case is carried by the side 6 of the main frame so that the engine shaft and the differential gear is disposed at one side of the longitudinal center of the machine, the purpose of this arrangement being hereinafter more fully set forth. Upon the side 6 of the main frame, I provide a bracket or bearing plate 23 which is preferably circular and may be formed integral with the frame. Mounted concentrically about and supported by the said bracket or bearing plate is an arched frame 24 having an annular flange 25 on its inner side which fits upon the bracket 23 so as to be capable of rotation thereabout. A bearing 26 is provided upon the said frame 24 and this bearing is journaled concentrically in the bearing plate or bracket 23. Bearings 27 are provided on the sides of the frame 24 adjacent the open end thereof and these bearings receive an axle 28 which carries a tractor wheel 29 of the same diameter as the wheel 10 but having a somewhat narrower tread than said wheel. An integral gear 30 is carried by the tractor wheel 29 and receives motion from a spur pinion 31 on the outer end of a transmission shaft 32 extending from the differential gear 19 in alinement with the shaft 17. It will thus be readily seen that when the tractor is traveling over a field in the usual manner power is applied to both tractor wheels and they are permitted to compensate for the differences in speed when the machine is turning a corner or following a curve.

In the illustrated embodiment of the invention, the axle 28 extends through a bearing 44 on the outer side of the arched frame 24 upon which is mounted a wheel 33 of less diameter and also of less width than either of the wheels 10 and 29, the said wheel 33 being preferably provided with a peripheral rib 34 adapted to take into the ground and hold the wheel to its path when the said wheel is in use. The inner side of the frame 24 is constructed with a circular enlargement to engage about the bearing plate or bracket 23 and upon the rear portion of the periphery of this enlargement 35, I form a worm gear 36 which meshes with a worm 37 formed upon the lower portion of a vertically disposed shaft 38 which is mounted in suitable brackets 39 carried by the main frame and equipped at its upper end with a hand wheel 40 whereby it may be manipulated when desired.

Usually, the apparatus will be arranged, as shown in Figs. 1 and 4, with the slidable frame disposed within the supplemental frame 4 and with its ends bridging the hinge connection 3. If it be desired to cultivate a row of growing plants, the slidable frame 8 is shifted inwardly so that it will assume the position shown in Fig. 5 with the tongues 9 extending through the slots 7 and the bolts 5 engaging openings in the ends of the slidable frame which were previously engaged by bolts 41 inserted through the ends of the supplemental frame. When the slidable frame is to be shifted inwardly, the transmission shaft 17 and the coupling 18 are removed so that when the slidable frame is shifted the shaft 15 will enter the gear case 22 and engage the members of the differential gear previously engaged by the shafts 17 and 32. It will be readily noted upon reference to Fig. 5 that this adjustment brings the tractor wheel 10 almost into alinement with the engine shaft and the engine so that power transmitted to the one tractor wheel will suffice to propel the machine and the width of the frame will be very materially reduced. After the slidable frame has been thus shifted transversely, the supplemental frame 4 is swung upwardly about the hinge connections 3, as shown in Fig. 5, and to retain it in its upright position any convenient form of brace, indicated at 42, may have one end engaged in the opening 43 from which the bolt 41 has been removed and have its other end engaged over the bolt 5. In this adjustment or rearrangement of the tractor, the shaft 32 and the axle 28 are withdrawn so that the spur gear 31 will be removed from within the arched frame 24 and the tractor wheel 29 likewise removed. The worm 37 is then actuated to cause the enlargement 35 to swing with the journal 26 as a center and bring the arched frame into the vertical position shown in Fig. 3. Inasmuch as the bearing 44 is eccentric to the journal 26, the wheel 33 will be thereby brought into engagement with the ground and will support the tractor so that, as clearly shown in Fig. 5, the row of growing plants will be cleared by the arched frame 24. A cultivator or other implement may be then coupled to the said arched frame by any convenient or preferred means and the projecting portion of the rear tongue 9 of the slidable frame may be utilized for that purpose, the said implement being thereby caused to travel along the row of plants at the sides of the same and loosen the soil or turn it up around the stems of the young plants.

From the foregoing description, taken in connection with the accompanying drawings, it will be seen that I have provided a very efficient apparatus which may be easily and quickly reduced in width so that it may be drawn along the rows of growing plants without injury to the plants and facilitate the cultivation of the same.

Having thus described the invention, what is claimed as new is:

1. In a tractor, the combination of a main frame, an arched frame pivotally mounted upon the side of the main frame, an axle removably fitted in the side of the arched frame eccentric to the pivot thereof, a traction member mounted for rotation about said axle, a ground-engaging member on the arched frame exteriorly thereto and concentric with the axle means concentric with the pivot of the arched frame for imparting motion to the traction member, and means supported by the main frame for pivotally adjusting the arched frame whereby upon removal of the axle and the traction member thereon the arched frame may travel along a row of plants and clear the same.

2. In a tractor, the combination of a main frame, an arched frame pivotally mounted on the side of the main frame, means for pivotally adjusting said arched frame, an axle fitted in the arched frame eccentric to the pivot thereof, ground-engaging members carried by said axle, one of said members being disposed within the arched frame and the other of said members being disposed exteriorly thereto and being of less diameter than the first-mentioned member, and means whereby power may be transmitted to the ground-engaging member disposed within the arched frame.

3. In a tractor, the combination of a main frame, a supplemental frame hinged to the side of the main frame, a slidable frame engaged with and carried by the supplemental frame and the main frame and bridging the hinged connection therebetween, a traction member carried by said slidable frame, and means for imparting motion to said traction member.

4. In a tractor, the combination of a main frame, a supplemental frame hingedly mounted upon the side of the main frame, an inner frame slidably engaging the main frame and the supplemental frame, a traction member carried by said inner frame, a transmission gearing disposed upon the main frame at the side thereof remote from the slidable frame, means whereby the slidable frame may be secured within the main frame or within the supplemental frame, and means whereby power may be transmitted to the traction member from the transmission gearing in either position of the slidable frame.

5. In a tractor, the combination of a main frame provided in one side with vertically disposed openings, a driving gearing mounted upon the frame at the said side thereof, a supplemental frame carried by the opposite side of the main frame, an inner frame slidably mounted upon the main frame and provided with tongues at its inner side adapted to engage the openings in the main frame, said inner frame being adapted to be arranged entirely within the main frame or partly within the supplemental frame, means for securing the inner frame in either position in which it may be set, a traction member carried by said inner frame, and means whereby power may be transmitted to said traction member in either position of the inner frame.

In testimony whereof I affix my signature.

JOHN C. ROSS.